(12) United States Patent
Mutoh

(10) Patent No.: US 6,766,246 B2
(45) Date of Patent: Jul. 20, 2004

(54) PORTABLE TERMINAL CAPABLE OF AUTOMATICALLY SWITCHING INTO MODERATE POWER CONSUMPTION MODE FOR RECEIVING DATA

(75) Inventor: Katsuhiko Mutoh, Obu (JP)

(73) Assignee: Denso Corporation, Kariya (JP)

( * ) Notice: Subject to any disclaimer, the term of this patent is extended or adjusted under 35 U.S.C. 154(b) by 122 days.

(21) Appl. No.: 10/107,289

(22) Filed: Mar. 26, 2002

(65) Prior Publication Data

US 2002/0143466 A1 Oct. 3, 2002

(30) Foreign Application Priority Data

Mar. 27, 2001 (JP) ......................................... 2001-090203
Jan. 25, 2002 (JP) ......................................... 2002-016896

(51) Int. Cl.$^7$ .............................. G01S 3/02; G01C 21/00
(52) U.S. Cl. ..................................................... 701/207
(58) Field of Search .......................... 701/200, 36, 201, 701/202, 205, 206, 207, 211, 213; 342/456, 457; 713/300, 320–321

(56) References Cited

U.S. PATENT DOCUMENTS 6,125,326 A * 9/2000 Ohmura et al. ............. 701/213
6,195,597 B1 * 2/2001 Yamada .................... 455/550.1
2001/0029588 A1 * 10/2001 Nakamura et al.

FOREIGN PATENT DOCUMENTS

JP        2000-315296        11/2000

* cited by examiner

*Primary Examiner*—Thu V. Nguyen
(74) *Attorney, Agent, or Firm*—Harness, Dickey & Pierce, PLC

(57) ABSTRACT

Personal digital assistance (PDA) is set in a second low-power-consumption (LPC) mode if its power switch is OFF, while the PDA is set in a normal mode if its power switch is ON. If it is determined that the PDA is connected to navigation equipment when the PDA is in the second LPC mode, the PDA automatically switches to a first LPC mode in which the functional blocks used for receiving position data from the navigation equipment and storing the received position data are activated but the other functional blocks are not activated. Then the PDA automatically receives the position data from the navigation equipment and stores the received position data. Thus the PDA can receive the latest position data without wasting the power of the PDA, even when its power switch is OFF.

17 Claims, 8 Drawing Sheets

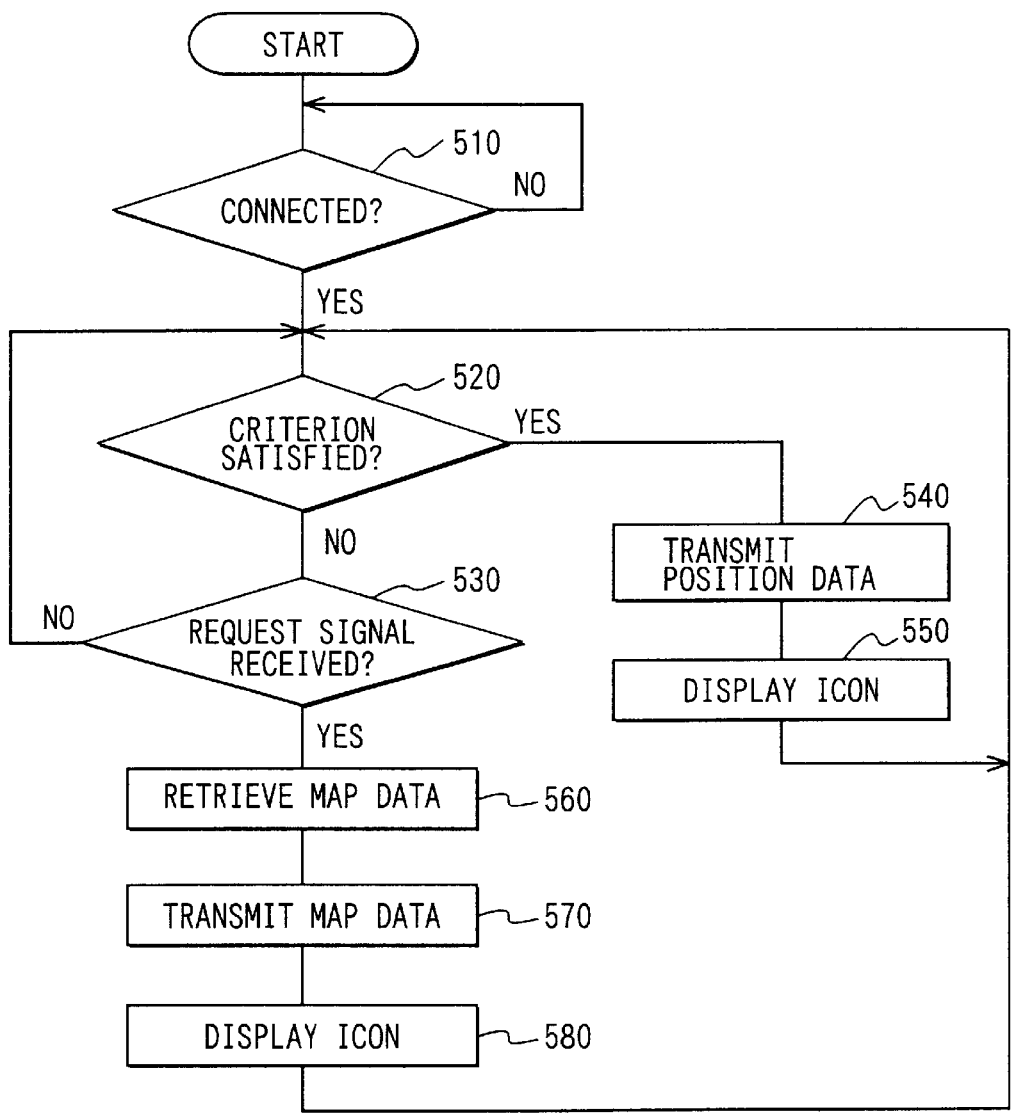

US 6,766,246 B2

PORTABLE TERMINAL CAPABLE OF AUTOMATICALLY SWITCHING INTO MODERATE POWER CONSUMPTION MODE FOR RECEIVING DATA

CROSS REFERENCE TO RELATED APPLICATION

The present application is based on and incorporates herein by reference Japanese Patent Applications No. 2001-90203 filed on Mar. 27, 2001 and No. 2002-16896 filed on Jan. 25, 2002.

BACKGROUND OF THE INVENTION

1. Field of the Invention

The present invention relates to a data transfer system which includes a portable terminal and navigation equipment.

2. Related Art

JP-A-2000-315296 proposes that personal digital assistance (PDA) receives data on the current position of a vehicle from vehicle navigation equipment and then displays the map data corresponding to the received position data.

However, according to JP-A-2000-315296, the PDA can receive the current position data only when the power switch of the PDA is ON. Therefore a user should turn on the power switch of the PDA, if the power switch is OFF when the current position data is transferred to the PDA.

If the user keeps the power switch of the PDA ON even when he/she drives so that the PDA does not miss receiving the current position data, this leads to waste of power of the PDA.

SUMMARY OF THE INVENTION

The present invention has an object to provide a portable terminal capable of automatically switching into a moderate power consumption mode in which the portable terminal can receive position data from vehicle navigation equipment.

The present invention also has an object to provide a portable terminal capable of automatically switching among a plurality of power consumption modes so as not to miss receiving position data from vehicle navigation equipment and so as not to waste the power of the portable terminal.

A portable terminal according to the present invention includes a power switch, connection detector means, position data receiver means, position data storage means and control means. A user operates the power switch for turning on and off the portable terminal. The connection detector means is provided for detecting the connection between the portable terminal and navigation equipment which transfers position data to the portable terminal. The position data receiver means is provided for receiving the position data from the navigation equipment. The position data storage means is provided for storing the position data received by the position data receiver means.

When the connection detection means detects the connection between the portable terminal and the navigation equipment, the control means sets the portable terminal at lowest in a first low-power-consumption mode in which the position data receiver means can receive the position data and the position data storage means can stores the received position data. Then the control means commands the position data receiver means to receive the position data from the navigation equipment, and further commands the position data storage means to store the received position data.

Preferably, the control means sets the portable terminal at lowest in a second low-power-consumption mode in which the connection detector means can detect the connection between the portable terminal and the navigation equipment, even when the power switch of the portable terminal is OFF.

BRIEF DESCRIPTION OF THE DRAWINGS

The above and other objects, features and advantages of the present invention will become more apparent from the following detailed description made with reference to the accompanying drawings. In the drawings:

FIG. 4 is a flowchart of a process executed by the CPU of the vehicle navigation equipment;

DETAILED DESCRIPTION OF THE PREFERRED EMBODIMENT

Figure 1:
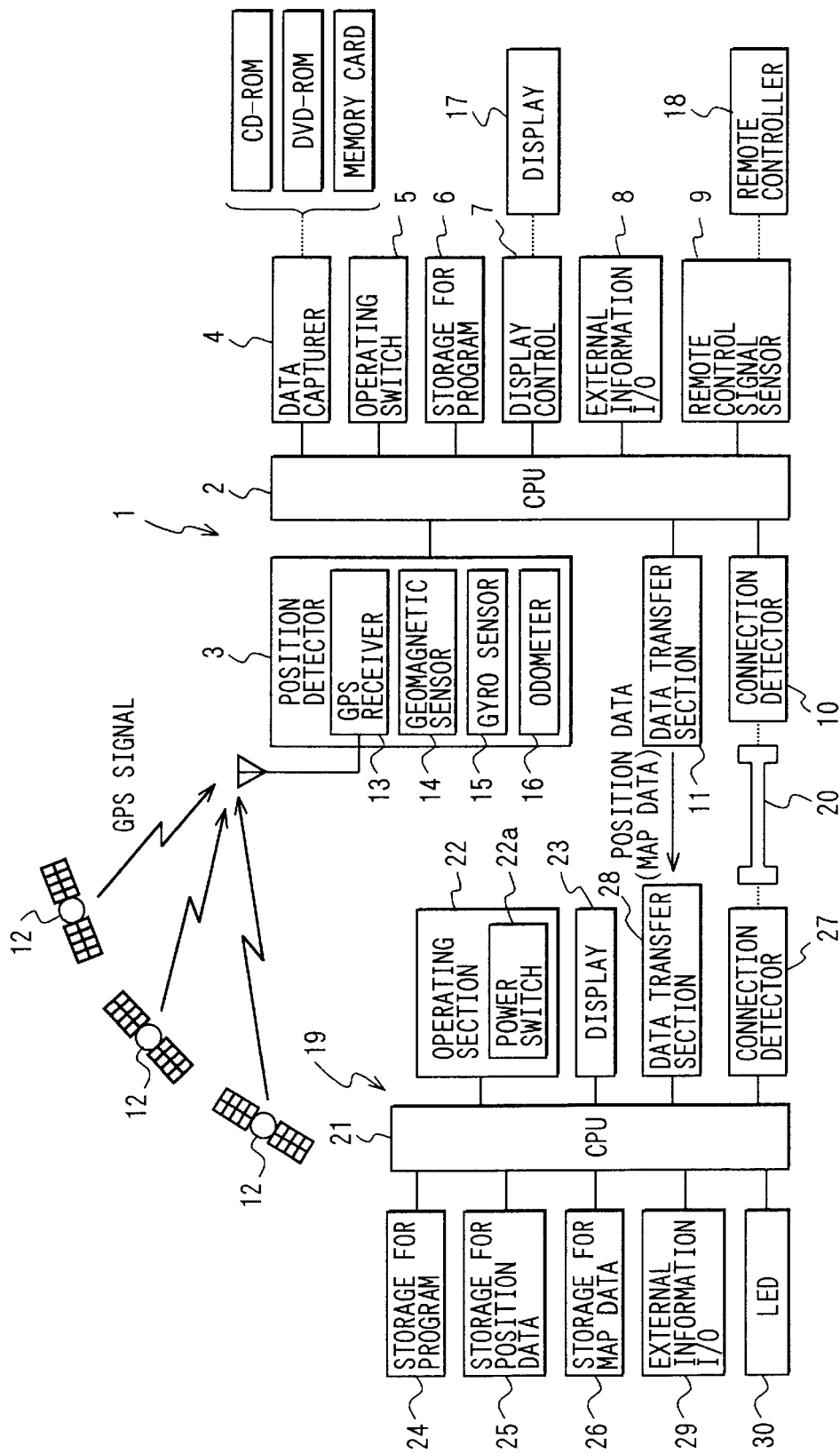
FIG. 1 is a functional block diagram showing a data transfer system which includes PDA and vehicle navigation equipment according to an embodiment of the present invention.

A portable terminal and navigation equipment according to an embodiment of the present invention are used as personal digital assistance (PDA) and vehicle navigation equipment, respectively. Referring to FIG. 1, the vehicle navigation equipment 1 includes a Central Processing Unit (CPU) 2 as control means, a position detector section 3 as position data acquisition means, a data capturer section 4, a operating switch section 5, a storage section 6, a display control section 7, an external information I/O section 8, a remote control signal sensor 9, a connection detector section 10, and a data transfer section 11 as position data transmitter means.

The position detector section 3 includes a GPS (Global Positioning System) receiver 13, a geomagnetic sensor 14, a gyro sensor 15 and an odometer 16. The GPS receiver 13 receives GPS signals from the GPS satellites 12, and calculates the position of the vehicle navigation equipment 1 using parameters included in the GPS signals. The geomagnetic sensor 14 measures the bearings of the vehicle navigation equipment 1 based on the earth's magnetism. The gyro sensor 15 measures the angular velocity of the vehicle navigation equipment 1 and determines the bearings based on the detected angular velocity. The odometer 16 measures the distance traversed by the vehicle navigation equipment 1. These sensors 13–16 are complementarily used for calculating the position of the vehicle navigation equipment 1, and the data on the calculated position is outputted to the CPU 2.

The data capturer section 4 captures various data such as map data, map matching data, landmark data or HTML (Hyper Text Markup Language) data stored in an external storage medium such as CD-ROM, DVD-ROM or a memory card. The operating switch section 5 is integrated with a display 17, and includes various switches. When some of the switches are operated by a user, the operating switch section 5 detects the operation and outputs a first operation signal corresponding to the detected operation to the CPU 2.

The storage section 6 stores a control program to be executed by the CPU 2. The display control section 7 controls the display 17 which corresponds to transfer notification means of the present invention. The external information I/O section 8 receives external information such as VICS (Vehicle Information & Communication System) information from the external, and transmits the internal information to the external. The remote control signal sensor 9 detects a remote control signal from a remote controller 18, and then outputs a second operation signal corresponding to the detected remote control signal to the CPU 2.

The connection detector section 10 determines whether the vehicle navigation equipment 1 is connected to the PDA 19 physically, that is, by a connecting cable 20. If it is determined that the vehicle navigation equipment 1 is physically connected to the PDA 19, the connection detector section 10 outputs a first connection detection signal to the CPU 2. The data transfer section 11 transmits the position data calculated by the position detector section 3 to the PDA 19 via the connecting cable 20, if a predetermined criterion is satisfied. Further the data transfer section 11 transmits map data, which corresponds to the position data and is obtained from an external storage medium by the data capturer section 4, to the PDA 19 via the connecting cable 20 in response to a request from the PDA 19.

On the other hand, the PDA 19 includes a CPU 21 as control means, an operating section 22, a display 23 as display means, a storage section 24, a position data storage 25 as position data storage means, a map data storage 26 as map data storage means, a connection detector section 27 as connection detector means, a data transfer section 28 as position data receiver means and map data receiver means, an external information I/O section 29, and an LED (Light Emitting Diode) 30 as mode notification means The operating section 22 includes various keys such as a power switch 22a, a set key and a release key arranged thereon. When some of the keys are operated by the user, the operating section 22 detects the operation and outputs a third operation signal corresponding to the detected operation to the CPU 21. The display 23 receives a display command signal from the CPU 21, and then displays information corresponding to the received display command signal. The storage section 24 stores a control program which corresponds to a program of the present invention and is executed by the CPU 21. The connection detector section 27 determines whether the PDA 19 is connected to the vehicle navigation equipment 1 physically, that is, by the connecting cable 20. If it is determined that the PDA 19 is physically connected to the vehicle navigation equipment 1, the connection detector section 27 outputs a second connection detection signal to the CPU 21.

The data transfer section 28 receives the position data transmitted by the vehicle navigation equipment 1. The CPU 21 stores the position data received by the data transfer section 28 in the position data storage 25. Further the data transfer section 28 receives the map data transmitted by the vehicle navigation equipment 1.

The map data storage 25 is used for storing map data. The CPU 21 determines whether the map data stored in the map data storage 26 corresponds to the position data lastly received from the vehicle navigation equipment 1. If it is determined that the map data corresponding to the lastly received position data is stored in the map data storage 26, the CPU 21 retrieves the map data from the map data storage 26 and commands the display 23 to display the retrieved map data. On the other hand, if it is determined that the map data corresponding to the lastly received position data is not stored in the map data storage 26, the CPU 21 commands the display 23 to display the map data which is received from the vehicle navigation equipment 1 by the data transfer section 28.

Figure 2:
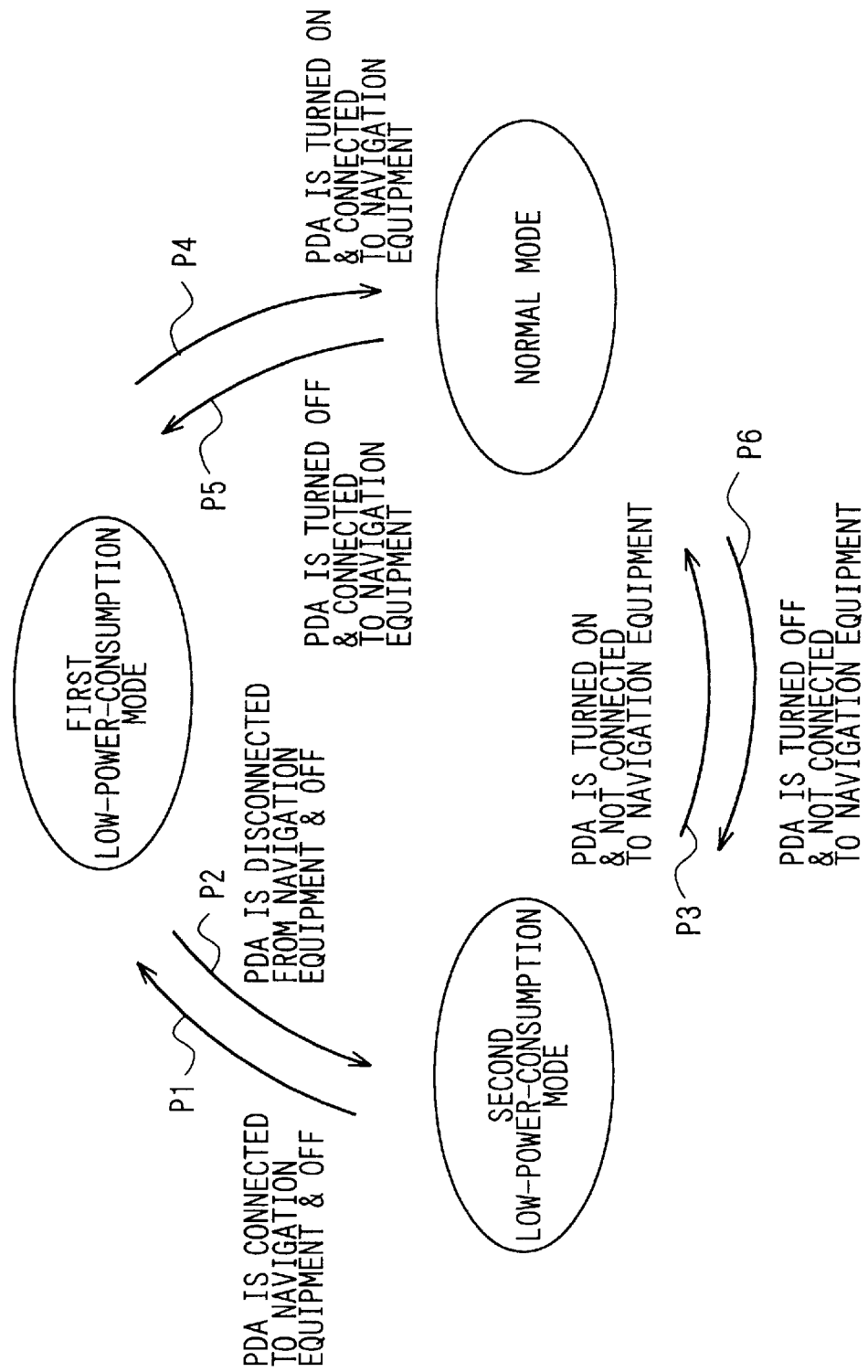
FIG. 2 is a state transition diagram showing how the mode of the PDA automatically switches.

The PDA 19 further includes a detachable secondary battery which supplies power to the PDA 19. Referring to FIG. 2, the PDA 19 automatically switches among a first low-power-consumption (LPC) mode, a second LPC mode and a normal mode.

When the PDA 19 is in the first LPC mode, the CPU 21 selectively activates the storage section 24, the position data storage 25, the map data storage 26, the connection detector section 27, the data transfer section 28 and the LED 30 so that the PDA 19 consumes moderate amounts of power. When the PDA 19 is in the second LPC mode, the CPU 21 selectively activates the storage section 24 and the connection detector section 27 so that the PDA 19 consumes low amounts of power. When the PDA 19 is in the normal mode, the CPU 21 activates all the functional blocks 22–30 so that the PDA 19 consumes high amounts of power.

Figure 3A:
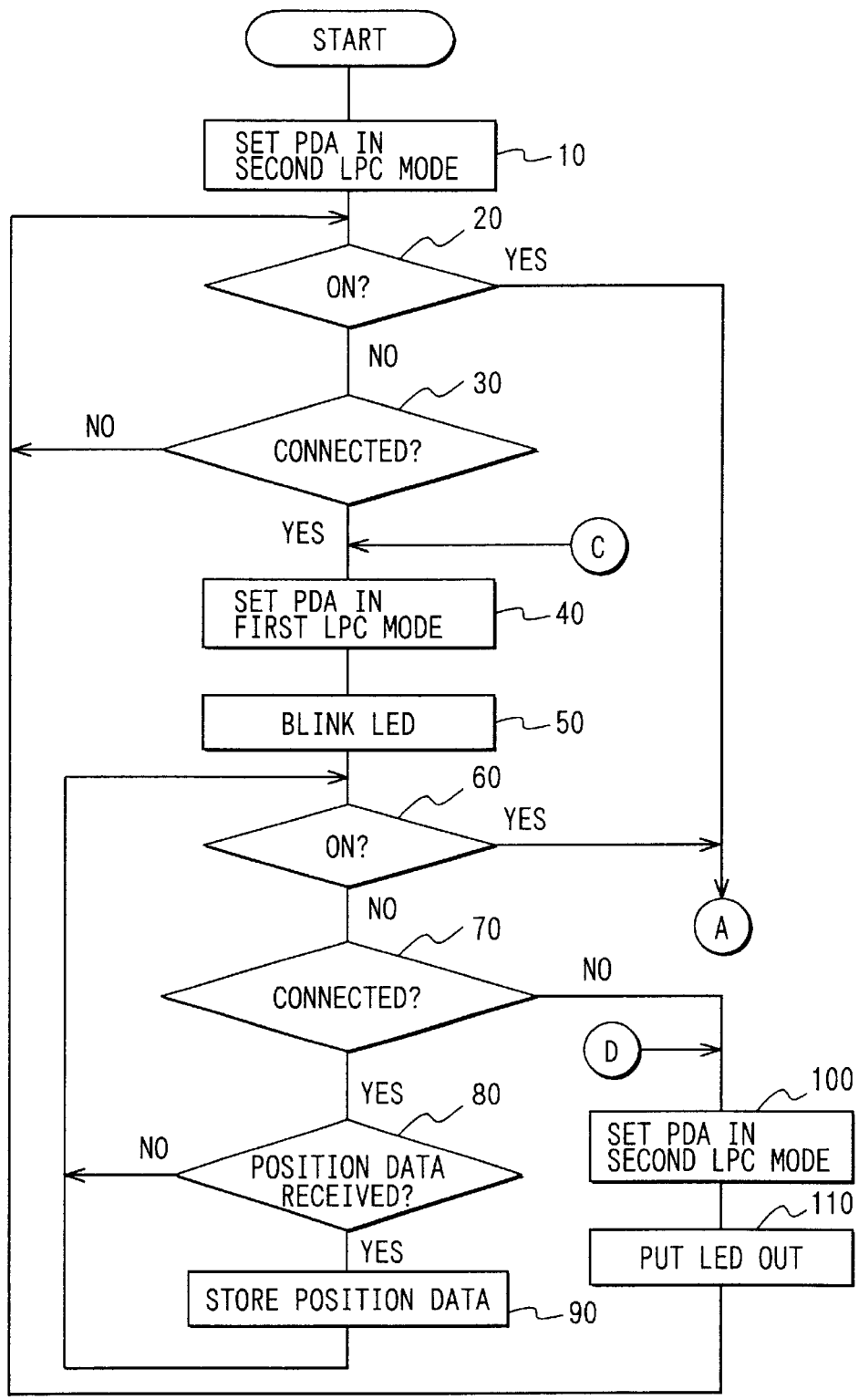
FIGS. 3A–3C are flowcharts of a process executed by the CPU of the PDA.
Figure 3B:
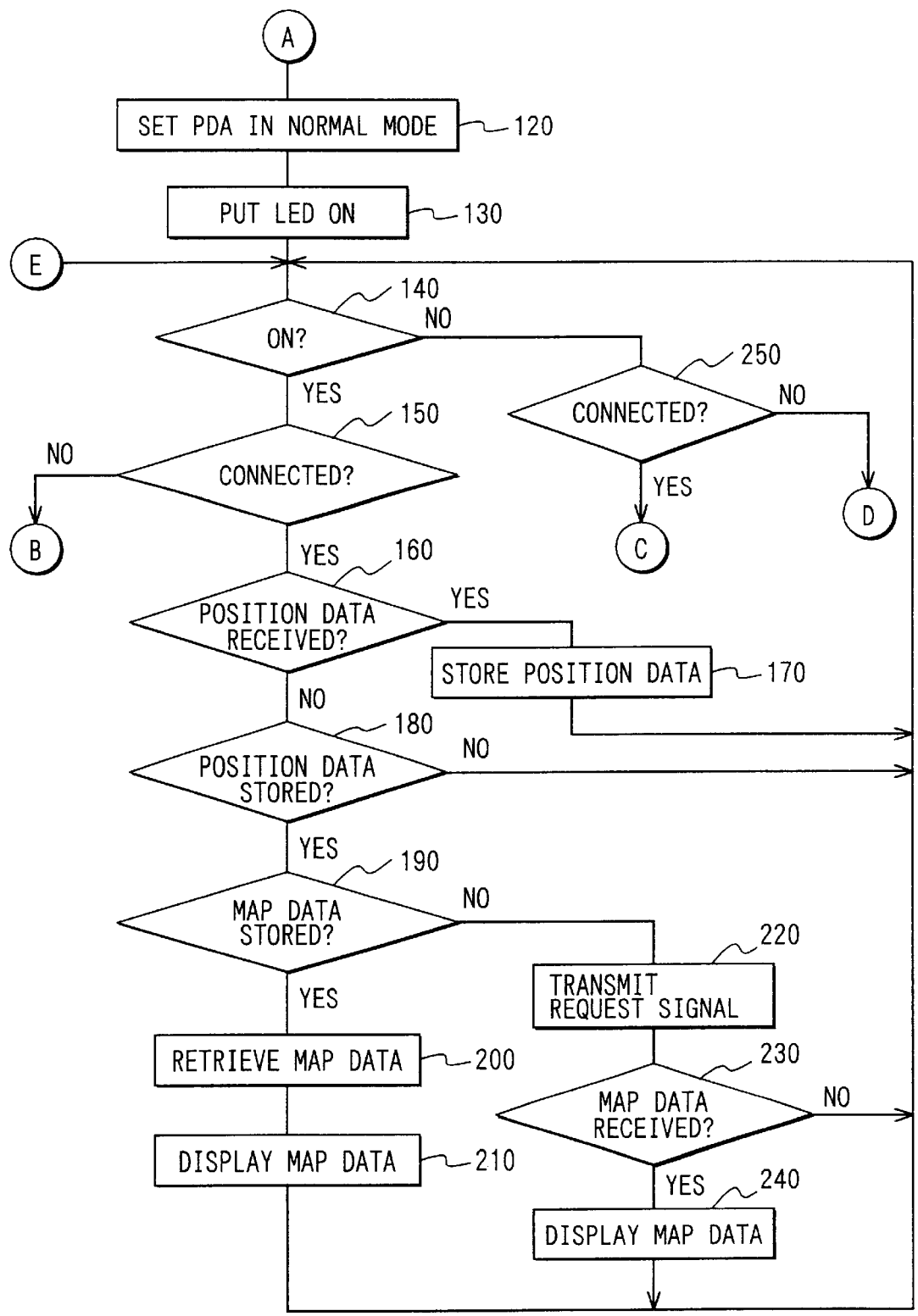

The CPU 21, which is a microcomputer, retrieves the control program from the storage section 24 and executes it so that the following process is executed. Referring to FIGS. 3A and 3B, the PDA 1 begins to operate in the second LPC mode at step 10 when the secondary battery is installed. Then it is determined at step 20 whether the power switch 22a of the PDA 19 is ON. If Yes (i.e., the power switch 22a of the PDA 19 is turned ON in the second LPC mode), the PDA is switched at step 120 from the second LPC mode to the normal mode as indicated by arrow P3 in FIG. 2 and the LED 30 is put on at step 130. The user can know by the lighted LED 30 that the PDA 19 has been switched to the normal mode.

If not (i.e., the power switch 22a is left OFF), it is further determined at step 30 whether the PDA 19 is physically connected to the vehicle navigation equipment 1. If not (i.e., the power switch 22a is OFF and the PDA 19 is not connected to the vehicle navigation equipment 1), the process returns to step 20 to iterate steps 20 and 30. If Yes (i.e., the power switch 22a is OFF and the PDA 19 is connected to the vehicle navigation equipment 1), then the PDA 19 is switched at step 40 from the second LPC mode to the first LPC mode as indicated by arrow P1 in FIG. 2 and the LED 30 is blinked at step 50. Then the user can know by the blinking LED 30 that the PDA 19 has been switched to the first LPC mode.

In the first LPC mode, it is determined at step 60 whether the power switch 22a is turned ON. If Yes (i.e., the power switch 22a is turned ON in the first LPC mode), the PDA 19 is switched at step 120 from the first LPC mode to the normal mode as indicated by arrow P4 in FIG. 2 and the LED 30 is put on at step 130. The user can know by the lighted LED 30 that the PDA 19 has been switched to the normal mode.

If not (i.e., the power switch 22a is left OFF), it is further determined at step 70 whether the PDA 19 is left connected to the vehicle navigation equipment 1. If not (i.e., the power switch 22a is left OFF and the PDA 19 is disconnected from the vehicle navigation equipment 1), the PDA 19 is switched at step 100 from the first LPC mode to the second LPC mode as indicated by arrow P2 in FIG. 2 and the LED 30 is put out at step 110. Then the user can know by the vanished LED 30 that the PDA 19 has been switched to the second LPC mode. Thereafter the process returns to step 20 to iterate steps 20 and 30.

If it is determined at step 70 that the PDA 19 is left connected to the vehicle navigation equipment 1 in the first LPC mode (i.e., Yes at step 70), it is further determined at step 80 whether the data transfer section 28 receives the position data from the vehicle navigation equipment 1. If not, the process returns to step 60 to iterate steps 60 and 70.

On the other hand, the CPU 2 of the vehicle navigation equipment 1, which is a microcomputer, retrieves the control program from the storage section 6 and executes it so that the following process is executed. Referring to FIG. 4, when power from the battery installed on the vehicle is supplied to the vehicle navigation equipment 1, it is determined at step 510 whether the vehicle navigation equipment 1 is physically connected to the PDA 10. If Yes, it is further determined at step 520 whether the predetermined criterion for transmitting the position data is satisfied. If Yes, the CPU 2 commands the data transfer section 11 to transmit the position data acquired by the position detector section 3 to the PDA 19 at step 540.

The criterion is, for example, that the distance further traveled by the vehicle on which the vehicle navigation equipment 1 is installed exceeds a predetermined distance. While the data transfer section 11 transmits the position data to the PDA 19, the CPU 2 commands the display 17 to display an icon which indicates that the position data is in transit at step 550. Then the user can know by the displayed icon that the position data is in transit.

Returning to FIG. 3A, when the vehicle navigation equipment 1 thus transmits the position data to the PDA 19, it is determined at step 80 that the position data is received from the vehicle navigation equipment 1. Then the process proceeds to step 90 to store the received position data in the position data storage 25. If the position data storage 25 already stores the previously received position data, the CPU 21 updates the stored position data using the newly received position data. Thereafter the process returns to step 60 to iterate steps 60–90.

Referring to FIG. 3B again, if the PDA 19 is switched to the normal mode, it is determined at step 140 whether the power switch 22a is left ON. If not (i.e., the power switch 22a is turned OFF), it is further determined at step 250 whether the PDA 19 is connected to the vehicle navigation equipment 1. If Yes (i.e., the power switch 22a is turned OFF and the PDA 19 is connected to the vehicle navigation equipment 1), the PDA 19 is switched at step 40 from the normal mode to the first LPC mode as indicated by arrow P5 and the LED 30 is blinked. The user can know by the blinking LED 30 that the PDA 19 is switched to the first LPC mode. Thereafter the process proceeds to step 60 to iterate steps 60–90.

If it is determined at step 250 that the PDA 19 is not connected to the vehicle navigation equipment 1 (i.e., the power switch 22a is turned OFF and the PDA 19 is not connected to the vehicle navigation equipment 1), the PDA 19 is switched at step 100 from the normal mode to the second LPC mode as indicated by arrow P6 and the LED 30 is put out at step 110. The user can know by the vanished LED 30 that the PDA 19 is switched to the second LPC mode.

If it is determined at step 140 that the power switch 22a is left ON, it is further determined at step 150 whether the PDA 19 is connected to the vehicle navigation equipment 1. If Yes (i.e., the power switch 22a is left ON and the PDA 19 is connected to the vehicle navigation equipment 1), it is determined at step 160 whether the data transfer section 28 receives the position data transferred from the vehicle navigation equipment 1. If Yes, the received position data is stored in the position data storage 25 at step 170. If the position data storage 25 stores the previously received position data, the CPU 21 updates the stored position data using the newly received position data. Thereafter the process returns to step 140 to iterate steps 140–160.

If it is determined at step 160 that the data transfer section 28 does not receive the position data from the vehicle navigation equipment 1 (i.e., No at step 160), it is determined at step 180 whether the position data storage 25 stores the position data. If not, the process returns to step 140 to iterate steps 140–180. If Yes, it is further determined at step 190 whether the map data corresponding to the stored position data is stored in the map data storage 26.

If Yes, the map data corresponding to the stored position data is retrieved from the map data storage 26 at step 200 and displayed on the display 23 at step 210. Thereafter the process returns to step 140 to iterate steps 140–240. If not (i.e., the map data corresponding to the stored position data is not stored in the map data storage 26), the CPU 21 commands the data transfer section 28 to transmit a request signal to the vehicle navigation equipment 1 at step 220.

Referring to FIG. 4 again, if it is determined at step 520 that the predetermined criterion for transmitting the position data is not satisfied (i.e., No at step 520), it is determined at step 530 whether the data transfer section 11 receives a request signal from the data transfer section 28 of the PDA 19. If Yes, the CPU 2 retrieves the map data corresponding to the position data, which has been lastly transmitted to the PDA 19, from an external storage medium by the data capturer section 4 at step 560.

Then the CPU 2 commands the data transfer section 11 to transmit the retrieved map data to the PDA 19 at step 570. Further the CPU 2 commands the display control section 7 to display an icon which indicates that the map data is in transit on the display 17 at step 580, while the data transfer section 11 transmits the map data to the PDA 19. The user can know by the displayed icon that the map data is in transit.

Returning to FIG. 3B, the CPU 21 of the PDA 19 determines at step 230 whether the data transfer section 28 receives the map data from the vehicle navigation equipment 1. If Yes, the CPU 21 commands the display 23 to display the received map data at step 240. Thereafter the process returns to step 140 to iterate steps 140–240.

Figure 3C:
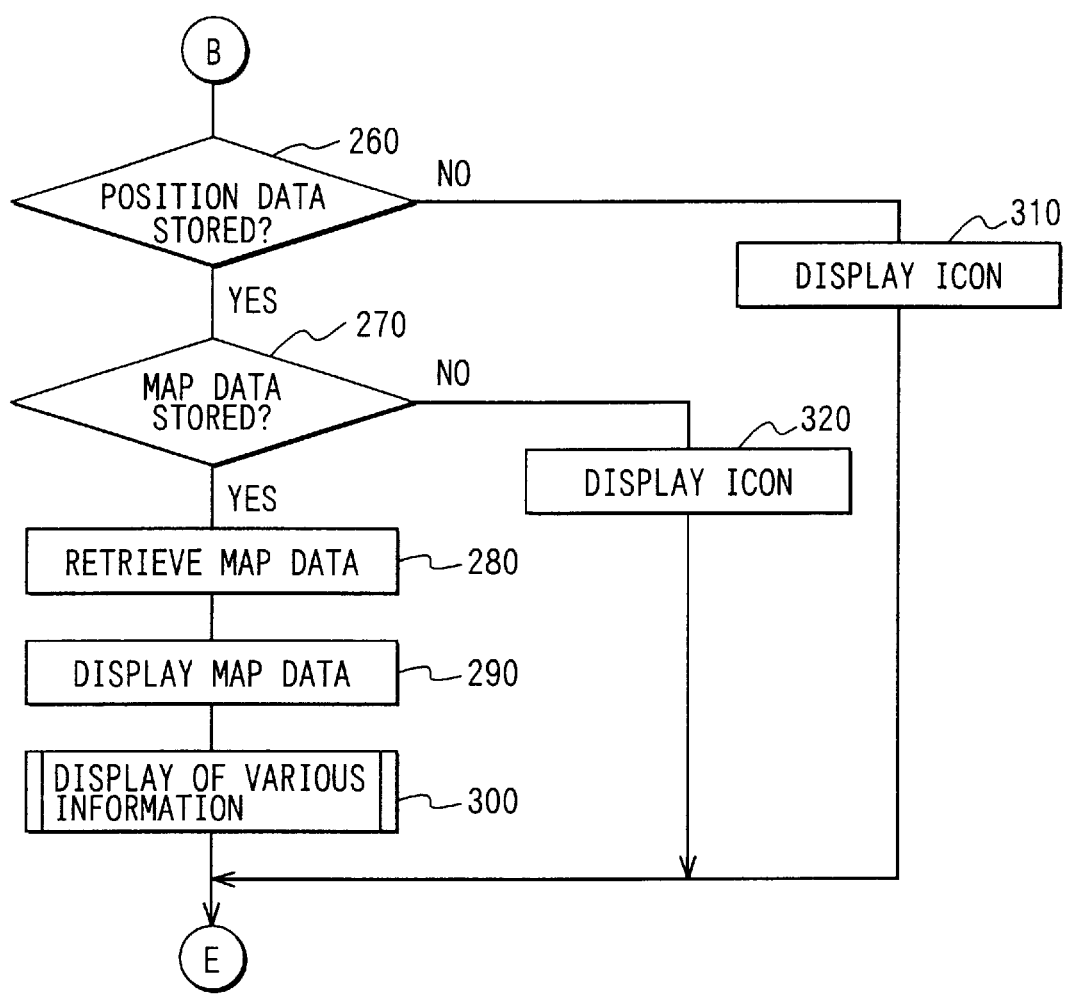

If it is determined at step 150 that the PDA 19 is not connected to the vehicle navigation equipment 1 (i.e., the power switch 22a is left ON and the PDA 19 is not connected to the vehicle navigation equipment 1), referring to FIG. 3C, it is determined at step 260 whether the position data storage 25 stores the position data. If Yes, it is further determined at step 270 whether the map data storage 26 stores the map data corresponding to the stored position data. If Yes, the map data corresponding to the stored position data is retrieved from the map data storage 26 at step 280 and displayed on the display 23 at step 290. Thereafter a display process is executed at step 300 for displaying various information based on the user's operation. Then the process returns to step 140 to iterate steps 140–240.

If it is determined at step 260 that the position data storage 25 does not store the position data (i.e., No at step 260), the CPU 21 commands the display 23 to display an icon which indicates that the position data is not stored at step 310. The user can know by the displayed icon that the position data is not stored. Thereafter the process returns to step 140 to iterate 140–240.

If it is determined at step 270 that the map data storage 26 does not store the map data corresponding to the stored position data (i.e., No at step 270), the CPU 21 commands the display 23 to display an icon which indicates that the map data corresponding to the stored position data is not stored at step 320. The user can know by the displayed icon that the map data corresponding to the stored position data is not stored.

Figure 5A:
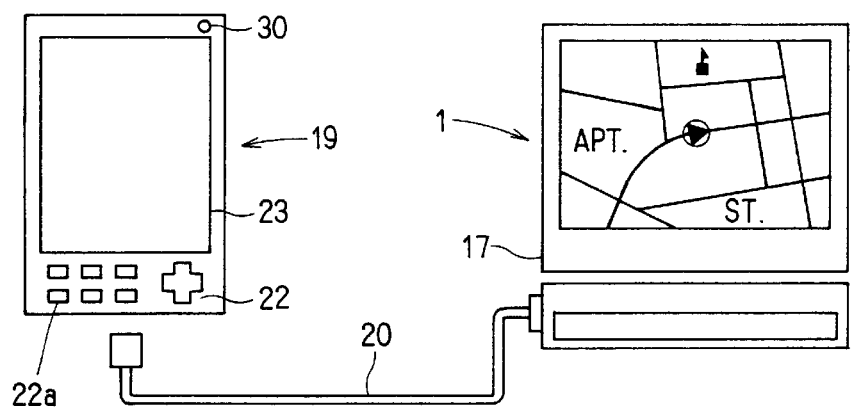
FIGS. 5A–5C are pictorial diagrams showing how the PDA receives position data from the vehicle navigation equipment switching its power consumption mode and displays it superimposed on map data stored in the PDA in a normal mode.
Figure 5B:
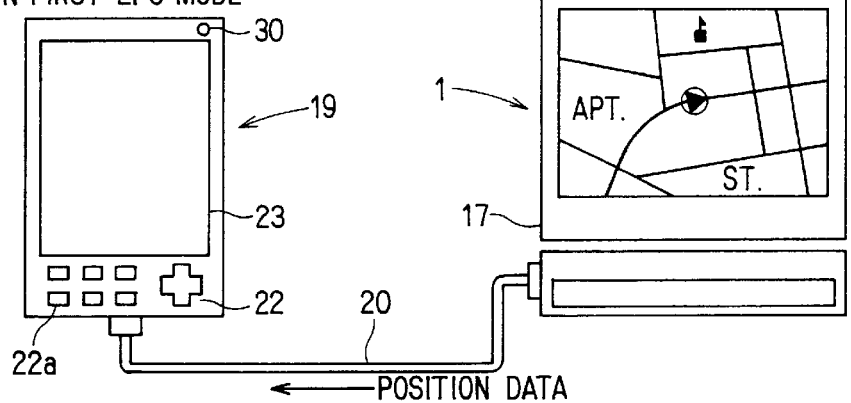
Figure 6A:
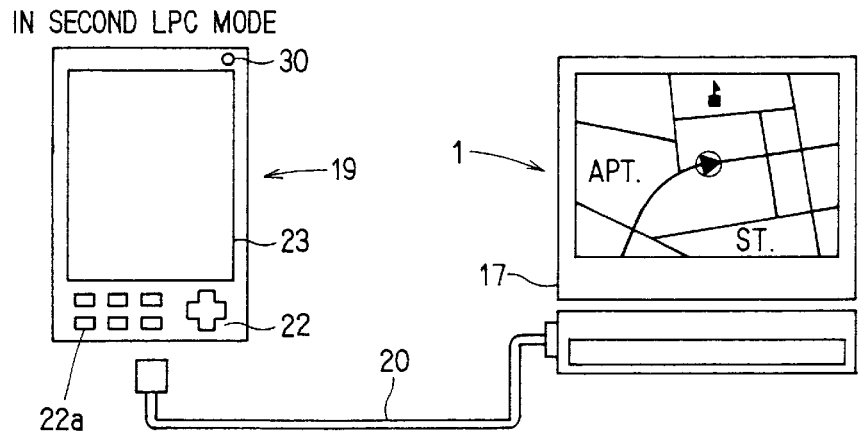
FIGS. 6A–6C are pictorial diagrams showing how the PDA receives position data from the vehicle navigation equipment switching its power consumption mode and displays it superimposed on map data received from the vehicle navigation equipment in the normal mode.
Figure 6B:
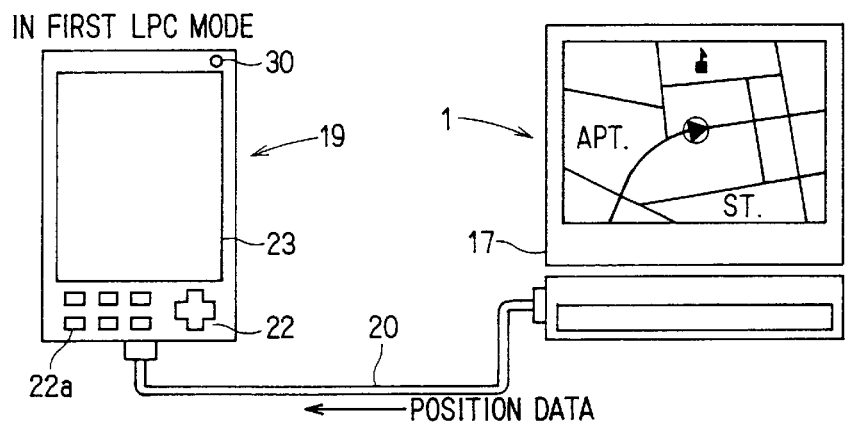

Accordingly, the PDA 19 is set in the second LPC mode as shown in FIGS. 5A and 6A, when the power switch 22a of the PDA 19 is OFF and the PDA 19 is not connected to the vehicle navigation equipment 1. The PDA 19 is set in the first LPC mode as shown in FIG. 5B and 6B, when the power switch 22a of the PDA 19 is OFF and the PDA 19 is connected to the vehicle navigation equipment 1. Thereby the PDA 19 can receive and store the latest position data transferred from the vehicle navigation equipment 1.

Figure 5C:
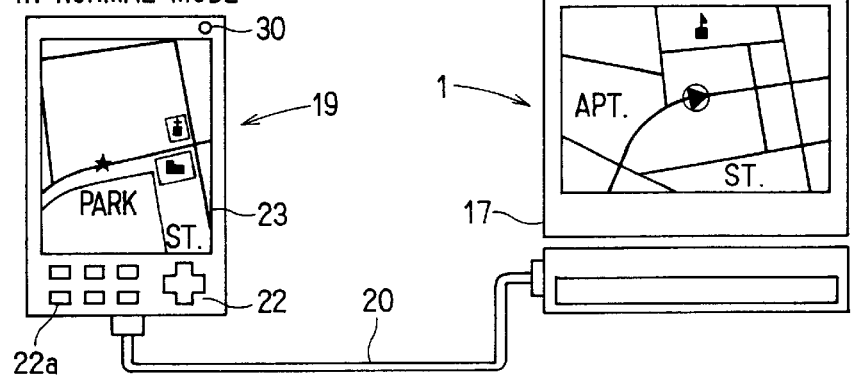

The PDA 19 is set in the normal mode, when the power switch 22a of the PDA 19 is ON. In the normal mode, the map data corresponding to the stored position data is retrieved and displayed on the display 23 of the PDA 19, if the map data corresponding to the stored position data is stored in the map data storage 26. In this case, a map other than a vehicle navigation map displayed on the display 17 of the vehicle navigation equipment 1 can be displayed on the display 23 of the PDA 19 as shown in FIG. 5C. For example, a walking map may be displayed on the display 23 of the PDA 19, if the data on the waking map is stored in the map data storage 26 of the PDA 19. In FIG. 5C, a star sign indicates the position corresponding to the stored position data.

Figure 6C:
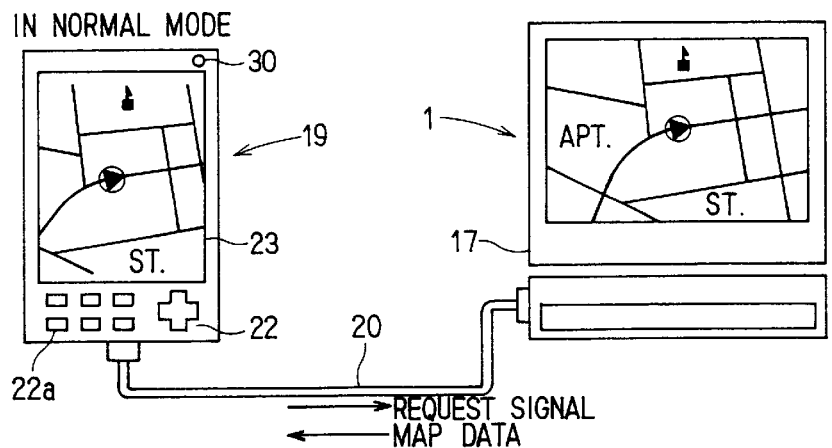

If the map data corresponding to the stored position data is not stored in the map data storage 26, the PDA 19 requests the vehicle navigation equipment 1 to transmit the map data corresponding to the stored position data and then displays the map data received from the vehicle navigation equipment 1 on the display 23. In this case, the same map as that displayed on the display 17 of the vehicle navigation equipment 1 is displayed on the display 23 of the PDA 19 as shown in FIG. 6C.

The PDA 19 may have the capability to compile a walking map from a vehicle navigation map received from the vehicle navigation equipment 1. Alternatively, the vehicle navigation equipment 1 may have the capability to compile a walking map from the vehicle navigation map and transmit the complied waking map to the PDA 19. In this case, the PDA 19 and/or the vehicle navigation equipment 1 are constructed so that the user can set the kind and/or the range of the map to be displayed on the display 23 of the PDA 19 by using the operating section 22 of the PDA 1 or by using the operating switch section 5 or the remote controller 18 of the vehicle navigation equipment 1.

According to the present embodiment, the following advantages are provided. When the PDA 19 is connected to the vehicle navigation equipment 1, the PDA 19 receives and stores the position data transmitted from the vehicle navigation equipment 1 even if the power switch 22a of the PDA 19 is OFF. Therefore the user is not required to turn on the power switch 22a of the PDA 19 for receiving the position data from the vehicle navigation equipment 1.

When the power switch 22 of the PDA 19 is OFF, the PDA 19 automatically switches to the second LPC mode in which the functional blocks used for detecting the connection between the PDA 19 and the vehicle navigation equipment 1 are activated but the other functional block are not activated. Thereby the PDA 19 can detect the connection between the PDA 19 and the vehicle navigation equipment 1 without wasting power.

If the connection between the PDA 19 and the vehicle navigation equipment 1 is detected when the power switch 22a of the PDA 19 is OFF, the PDA 19 automatically switches from the second LPC mode to the first LPC mode in which the functional blocks used for receiving and storing the position data are activated but the other functional blocks are not activated. Thereby the PDA 19 can receive the latest position data as soon as it is connected to the vehicle navigation equipment 1 without wasting power.

When the map data storage 26 of the PDA 19 stores the map data corresponding to the position data which is received from the vehicle navigation equipment 1 and stored in the position data storage 25, the PDA 19 retrieves the map data corresponding to the position data from the map data storage 26 and displays the retrieved map data on the display 23. Therefore, if a map to be frequently used (e.g., a map of the vicinity of the user's home or a map of the route to the user's office) is stored in the map data storage 26, the PDA 19 can display such a map rapidly on the display 23 without receiving the map from the vehicle navigation equipment 1.

In this case, the capacity of the map data storage 26 is not required to be large, because the map data stored in the map data storage 26 should include data on a map of a limited area. When the PDA 19 is required to display a map of an area other than the limited area, the PDA 19 can transmit a request signal to the vehicle navigation equipment 1 and thereby receive the required map data from the vehicle navigation equipment 1.

According to the present embodiment, the PDA 19 receives the position data from the vehicle navigation equipment 1 via the connecting cable 20. Therefore the PDA 19 consumes lower amounts of power in comparison with the case that the position data is received via radio waves, and thereby the duration of continuous use of the PDA 19 is prolonged. If the PDA 19 receives the position data via radio waves, the PDA 19 consumes higher amounts of power when it operates in a stand-by mode expecting to receive the position data.

Further according to the present embodiment, the user can know by the state of the LED 30 which of the three modes the PDA 19 is in. That is, the vanished LED 30 indicates that the PDA 19 is in the second LPC mode. The blinking LED 30 indicates that the PDA 19 is in the first LPC mode. The lighted LED 30 indicates that the PDA 19 is in the normal mode.

Moreover, the vehicle navigation equipment 1 displays the icon which indicates that the position data is in transit on its display 17. Therefore the user can know that the position data is in transit by the displayed icon. Further, in this case, the amount of power consumed by the PDA 19 is reduced in comparison with the case that the icon for indicating that the position data is in transit is displayed on the display 23 of the PDA 19.

Modifications

In the above embodiment, the vehicle navigation equipment 1 may transmit the position data to the PDA 19, when the user operates the operating section 22 of the PDA 19, the operating switch section 5 or the remote controller 18 of the vehicle navigation equipment 1 in a predetermined manner or when the user turns on the ignition key of the vehicle. In this case, the criterion used at step 520 of FIG. 4 is that the user has operated the PDA 19 or the vehicle navigation equipment 1 in the predetermined manner, or that the user has turned on the ignition key.

The icon for indicating that the position data is in transit may be displayed on the display 23 of the PDA 19 instead of the display 17 of the vehicle navigation equipment 1. Further a text massage may be displayed on the display 17 of the vehicle navigation equipment 1 or the display 23 of the PDA 19 instead of the icon.

In the above embodiment, the PDA 19 may receive the position data from the vehicle navigation equipment 1 via radio waves instead of the connecting cable 20. Further in the above embodiment, the position detector section 3 of the vehicle navigation equipment 1 may include sensors other than the GPS receiver 13, the geomagnetic sensor 14, the gyro sensor 15 or the odometer 16.

The control programs may be stored in the storage sections 6, 24 of the vehicle navigation equipment 1 and the PDA 19, when the vehicle navigation equipment 1 and PDA 19 are manufactured. However, the control programs may be downloaded from a server by the user. Further the control programs may be provided in the form of a storage medium such as a card memory which stores the control programs, and installed on the vehicle navigation equipment 1 and the PDA 19, respectively.

The portable terminal according to the present invention may be used as a portable terminal other than the PDA 19. For example, the portable terminal according to the present invention may be used as a cellular phone. Further the navigation equipment according to the present invention may be used as navigation equipment other than the vehicle navigation equipment 1 installed on the vehicle. For example, the navigation equipment according to the present invention may be used as portable navigation equipment.

The present invention is not limited to the above embodiment and modifications, but may be variously embodied within the scope of the invention.

What is claimed is:

1. A portable terminal for acquiring position data from navigation equipment, comprising:
    a power switch by which a user turns on and off said portable terminal;
    connection detector means for detecting connection between said portable terminal and said navigation equipment;
    position data receiver means for receiving the position data from said navigation equipment;
    position data storage means for storing the position data received by said position data receiver means; and
    control means for activating said position data receiver means and said position data storage means irrespective of an ON/OFF state of said power switch if said connection detector means detects the connection between said portable terminal and said navigation equipment, wherein said control means further commands said position data receiver means to receive the position data from said navigation equipment and commands said position data storage means to store the received position data, if said connection detector means detects the connection between said portable terminal and said navigation equipment.

2. A portable terminal as in claim 1, wherein said position data receiver means receives the position data from said navigation equipment via a cable.

3. A portable terminal for acquiring position data from navigation equipment comprising:
    position data receiver means for receiving the position data from said navigation equipment;
    position data storage means for storing the position data received by said position data receiver means; and
    control means for setting said portable terminal in a first low-power-consumption mode in which functions of receiving the position data from said navigation equipment by said position data receiver means and storing the received position data in said position data storage means are activated, wherein said control means further commands said position data receiver means to receive the position data from said navigation equipment and commands said position data storage means to store the received position data.

4. A portable terminal as in claim 3, wherein said position data receiver means receives the position data from said navigation means via a cable.

5. A portable terminal for acquiring position data from navigation equipment comprising:
    position data receiver means for receiving the position data from said navigation equipment;
    position data storage means for storing the position data received by said position data receiver means;
    control means for setting said portable terminal in a first low-power-consumption mode in which functions of receiving the position data from said navigation equipment by said position data receiver means and storing the received position data in said position data storage means are activated, wherein said control means further commands said position data receiver means to receive the position data from said navigation equipment and commands said position data storage means to store the received position data;
    a power switch by which a user turns on and off said portable terminal; and
    connection detector means for detecting connection between said portable terminal and said navigation equipment,
    wherein said control means sets said portable terminal in a second low-power-consumption mode in which a function of detecting the connection between said portable terminal and said navigation equipment by said connection detector means is activated, if said power switch is OFF and the portable terminal is disconnected from the navigation equipment.

6. A portable terminal as in claim 5, wherein:
    said control means switches said portable terminal from said second low-power-consumption mode to said first low-power-consumption mode, if said connection detector means detects the connection between said portable terminal and said navigation equipment when said portable terminal is in said second low-power-consumption mode; and
    said control means further commands said position data receiver means to receive the position data from said navigation equipment and commands said position data storage means to store the received position data, if said connection detector means detects the connection between said portable terminal and said navigation equipment.

7. A portable terminal as in claim 6 further comprising display means for displaying map data corresponding to the position data, wherein:

said control means sets said portable terminal in a normal mode in which at least functions for receiving the position data by said position data receiver means, storing the received position data by said position data storage means, detecting the connection between said portable terminal and said navigation equipment by said connection detector means and displaying the map data are activated, if said power switch is ON; and said control means further commands said display means to display the map data corresponding to the lastly received position data, if said power switch is ON.

8. A portable terminal as in claim 7 further comprising:

map data storage means for storing the map data; and map data receiver means for receiving the map data from said navigation equipment, wherein:

when said map data storage means stores the map data corresponding to the position data received by said position data receiver means, said control means retrieves the map data from said map data storage means said display means to display the retrieved map data; and when said map data storage means does not store the map data corresponding to the position data received by said position data receiver means, said control means commands said map data receiver means to receive the map data corresponding to the position data received by said position data receiver means from said navigation equipment and commands said display means to display the received map data.

9. A portable terminal as in claim 7, wherein said display means displays the map data corresponding to a map whose range and kind are specified by the user.

10. A portable terminal as in claim 7 further comprising mode notification means for notifying the user of the mode of said portable terminal, wherein said control means determines which of said first low-power-consumption mode, said second low-power-consumption mode and said normal mode said portable terminal is currently in, and notifies the user of the current mode of said portable terminal by said mode notification means.

11. A data transfer system comprising:

a portable terminal which comprises:
   a power switch by which a user turns on and off said portable terminal;
   connection detector means for detecting connection between said portable terminal and said navigation equipment;
   position data receiver means for receiving the position data from said navigation equipment;
   position data storage means for storing the position data received by said position data receiver means; and
   control means for activating said position data receiver means and said position data storage means irrespective of an ON/OFF state of said power switch if said connection detector means detects the connection between said portable terminal and said navigation equipment, wherein said control means further commands said position data receiver means to receive the position data from said navigation equipment and commands said position data storage means to store the received position data, if said connection detector means detects the connection between said portable terminal and said navigation equipment; and navigation equipment which comprises:
   position data acquisition means for acquiring position data;
   position data transmitter means for transmitting the position data to said portable terminal; and
   control means for commanding said position data transmitter means to transmit the position data acquired by said position data acquisition means to said portable terminal.

12. A data transfer system as in claim 11, wherein:

at least one of said portable terminal and said navigation equipment includes transfer notification means for notifying the user that data is being transmitted from said navigation equipment to said portable terminal; and at least one of said control means of said portable terminal and said control means of said navigation equipment commands said transfer notification means to notify the user that data is being transmitted from said navigation equipment to said portable terminal, while the data is transmitted from said navigation equipment to said portable terminal.

13. A program for causing a portable terminal to perform a method comprising the steps of:

determining whether said portable terminal is connected to navigation equipment from which said portable terminal acquires position data;

receiving the position data irrespective of an ON/OFF state of a power switch by which a user turns said portable terminal on and off, when it is determined that said portable terminal is connected to said navigation equipment; and storing the received position data.

14. A method for transmitting position data from navigation equipment to a portable terminal, said method comprising the steps of:

determining whether a power switch of said portable terminal is ON;

determining whether said portable terminal is connected to said navigation equipment;

setting said portable terminal in a first low-power-consumption mode in which functions of reception and storage of position data are activated, if it is determined that said power switch of said portable terminal is not ON and is connected to said navigation equipment;

transmitting said position data from said navigation equipment to said portable terminal;

said portable terminal receiving said position data; and said portable terminal storing said received position data.

15. A method for transmitting position data from navigation equipment to a portable terminal, said method comprising the steps of:

determining whether a power switch of said portable terminal is ON;

setting said portable terminal in a normal mode in which functions of transmission and reception of data, functions of storage and retrieval of data, a function of detection of connection between said portable terminal and said navigation equipment and a function of display of data are activated, if it is determined that said power switch of said portable terminal is ON;

determining whether said portable terminal is connected to said navigation equipment;

setting said portable terminal in a first low-power-consumption mode in which functions of reception and storage of position data are activated, if it is determined that said power switch of said portable terminal is not ON and is connected to said navigation equipment;

transmitting said position data from said navigation equipment to said portable terminal;

said portable terminal receiving said position data;

said portable terminal storing said received position data; and setting said portable terminal in a second low-power-consumption mode in which a function of detection of connection between said portable terminal and said navigation equipment is activated, if it is determined that said power switch of said portable terminal is not ON and the portable terminal is disconnected from the navigation equipment.

16. A method as in claim 15 further comprising the steps of:

acquiring map data corresponding to said stored position data if said portable terminal is set in the normal mode; and displaying said acquired map data if said portable terminal is set in the normal mode.

17. A method as in claim 16, wherein said acquiring step comprises the steps of:

determining whether the map data corresponding to said stored position data is stored in said portable terminal;

retrieving the map data if it is determined that the map data is stored in said portable terminal; and receiving the map data from said navigation equipment, if it is determined that the map data is not stored in said portable terminal.

* * * * *